(12) United States Patent
Parrish

(10) Patent No.: US 7,404,938 B2
(45) Date of Patent: Jul. 29, 2008

(54) EMISSION CONTROL SYSTEM

(75) Inventor: Clyde F. Parrish, Melbourne, FL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 945 days.

(21) Appl. No.: 10/845,418

(22) Filed: May 11, 2004

(65) Prior Publication Data

US 2005/0255019 A1 Nov. 17, 2005

(51) Int. Cl.
  $B01D\ 53/50$ (2006.01)
  $B01D\ 53/56$ (2006.01)
  $B01J\ 10/00$ (2006.01)
  $C01B\ 17/69$ (2006.01)
  $C01B\ 21/38$ (2006.01)

(52) U.S. Cl. .................. 423/210; 423/235; 423/242.1; 423/243.01; 423/393; 423/522; 422/105; 422/108; 422/168; 422/169; 422/170; 422/172; 422/173

(58) Field of Classification Search .............. 423/210, 423/235, 242.1, 243.01, 393, 522; 422/105, 422/108, 168, 169, 170, 172, 173

See application file for complete search history.

(56) References Cited

U.S. PATENT DOCUMENTS

| | | | | |
|---|---|---|---|---|
| 3,760,061 A * | 9/1973 | Hammond | .............. | 423/243.01 |
| 3,991,167 A * | 11/1976 | Depommier et al. | ......... | 423/393 |
| 4,341,747 A * | 7/1982 | Downey | ..................... | 423/235 |
| 5,112,587 A * | 5/1992 | von Wedel et al. | ........... | 423/235 |
| 5,151,258 A * | 9/1992 | Gubanc et al. | ............... | 423/235 |
| 5,595,713 A * | 1/1997 | Gohara et al. | ................ | 422/170 |
| 5,674,459 A * | 10/1997 | Gohara et al. | ................ | 422/170 |
| 6,039,783 A * | 3/2000 | Lueck et al. | .................... | 71/59 |
| 6,162,409 A * | 12/2000 | Skelley et al. | ............. | 423/239.1 |
| 2003/0026750 A1 * | 2/2003 | Page | .......................... | 423/235 |
| 2006/0057047 A1 * | 3/2006 | Schoubye et al. | ......... | 423/242.1 |

* cited by examiner

Primary Examiner—Timothy C Vanoy
(74) Attorney, Agent, or Firm—Randall M. Heald; Thomas W. Leffert

(57) ABSTRACT

Methods and apparatus utilizing hydrogen peroxide are useful to reduce NOx, SOx and mercury (or other heavy metal) emissions from combustion flue gas streams. Continuous concentration of hydrogen peroxide to levels approaching or exceeding propellant-grade hydrogen peroxide facilitates increased system efficiency. In this manner, combustion flue gas streams can be treated for the removal of NOx, SOx and heavy metals, while isolating useful by-products streams of sulfuric acid and nitric acid as well as solids for the recovery of the heavy metals.

37 Claims, 2 Drawing Sheets

EMISSION CONTROL SYSTEM

STATEMENT OF GOVERNMENT INTEREST

The invention described herein was made by an employee of the United States Government and may be manufactured and used by or for the Government of the United States of America for governmental purposes without the payment of any royalties thereon or therefor.

TECHNICAL FIELD OF THE INVENTION

The present invention relates generally to emission control and in particular to the control of emissions from combustion sources.

BACKGROUND OF THE INVENTION

Control of emissions from fossil fuel combustions sources addresses a major environmental problem. The Environmental Protection Agency (EPA) through the Clean Air Act regulates the emissions from fossil fuel-fire power plants. Initial regulations were focused on oxides-of-nitrogen (NOx) and oxides-of-sulfur (SOx) emissions, but newer regulations will include provisions to control heavy metals (Hg, etc.) and carbon dioxide.

Gas streams from combustion processes are often scrubbed, i.e., contacted with water, to remove many of their contaminants. However, these scrubbing processes often produce hazardous waste streams that must be dealt with.

For the reasons stated above, and for other reasons stated below that will become apparent to those skilled in the art upon reading and understanding the present specification, there is a need in the art for alternative methods and apparatus for treating combustion gas streams.

SUMMARY

Methods and apparatus utilizing hydrogen peroxide to reduce NOx, SOx and mercury (or other heavy metal) emissions are described herein. Continuous concentration of hydrogen peroxide ($H_2O_2$) to levels approaching or exceeding propellant-grade hydrogen peroxide facilitates increased system efficiency. By utilizing methods and apparatus in accordance with the invention, combustion flue gas streams can be treated for the removal of NOx, SOx and heavy metals, while isolating useful by-products streams of sulfuric acid and nitric acid as well as solids for the recovery of the heavy metals.

The invention further includes methods and apparatus of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and chemical changes may be made without departing from the spirit and scope of the present invention. It is noted that the drawings are not to scale unless a scale is provided thereon. The following detailed description is, therefore, not to be taken in a limiting sense, and the scope of the present invention is defined only by the appended claims and equivalents thereof Emission control systems in accordance with the invention address environmental pollutants NOx, SOx and heavy metals. Such systems are designed to control emissions of these environmental pollutants to the levels established by the EPA.

Figure 1:
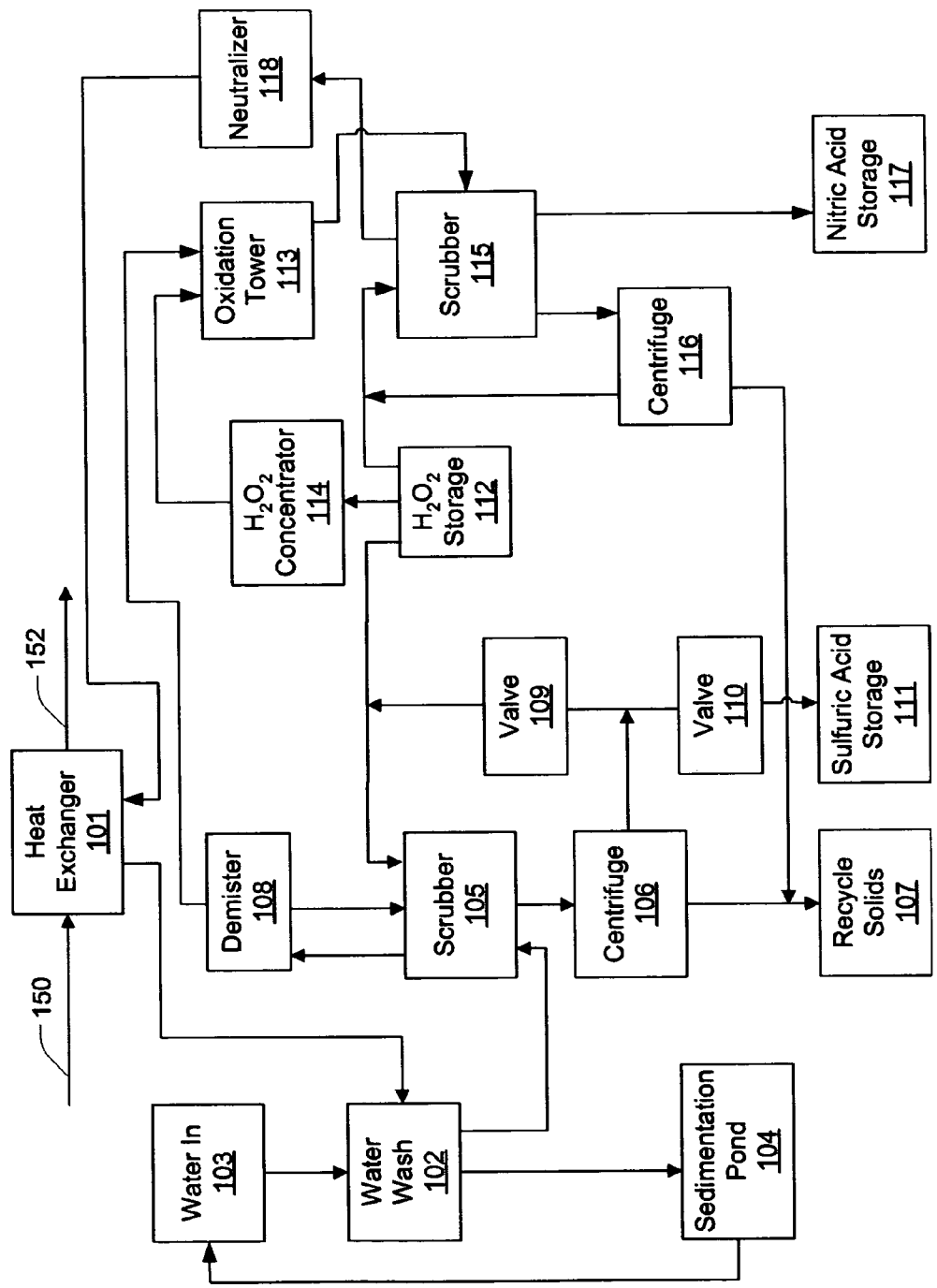
FIG. 1 is a block schematic of an emission control system in accordance with an embodiment of the invention.

FIG. 1 is a block schematic of an emission control system in accordance with an embodiment of the invention. The process starts with a gas stream, such as flue gas after the particulates have been removed. There are several options for this design and steps can be omitted or alternate unit operations may be substituted for the general processes depending on the requirements of the installation. These alternate steps are noted during the description of the process.

The first step of the process is to use a heat exchanger 101 to cool the entering flue gas 150 or other gas stream and reheat the exiting processed flue gas 152. Alternately, an exhaust fan could be used in place of the heat exchanger 101, if desired, to boost the flue gas 152 out of an exhaust stack. The cooled flue gas 150 exits the heat exchanger 101 and is fed to a washer 102 where additional particulates are removed with process water 103 provided to washer 102. Particulates and wash water are sent from washer 102 to the sedimentation pond 104. Water is then recirculated from sedimentation pond 104 back to process water 103.

The washed flue is fed from washer 102 to a scrubber 105 for the removal of SOx and/or heavy metals, such as mercury (Hg). Scrubber 105 uses hydrogen peroxide from hydrogen peroxide storage 112 to oxidize sulfurous acid to sulfuric acid to prevent reemission of $SO_2$. Hydrogen peroxide storage 112 preferably provides aqueous hydrogen peroxide of approximately 50% to 70% by volume, and more preferably at approximately 70% by volume. As the pH increases due to the formation of sulfuric acid, some of the heavy metals, including Hg, are dispersed as metal oxides and dissolved hydroxides are converted to sulfates. The remaining undissolved particulates and insoluble sulfates are removed with a centrifuge 106, such as a solid-bowl centrifuge. The SOx and/or heavy metal scrubber liquor is fed to the centrifuge 106. The centrifuge 106 separates the solids that are discharged to the recycle solids container 107. The cleaned scrubber liquor is discharged from the centrifuge 106 and can be split using valves 109 and 110 to allow the centrifuge 106 to act as a circulation pump for the scrubber 105. Opening valve 110 controls the level of scrubber liquor once the desired concentration of sulfuric acid is achieved. The scrubber liquor exiting valve 110 is provided to sulfuric acid storage 111, which can then be utilized for fertilizer or industrial uses. The scrubber liquor exiting valve 109 is mixed with hydrogen peroxide and returned to the scrubber 105 as a first scrubbing mixture. The concentration of hydrogen peroxide in the first scrubbing mixture is maintained at a predetermined level, e.g., at least 0.1%. Control of the hydrogen peroxide level fed to scrubber 105 may be maintained using a hydrogen peroxide controller such as that described in U.S. Pat. No. 6,039,783, issued to Lueck et al. on Mar. 21, 2000 and titled "PROCESS AND EQUIPMENT FOR NITROGEN OXIDE WASTE CON- VERSION TO FERTILIZER." U.S. Pat. No. 6,039,783 is commonly assigned and is incorporated by reference in its entirety herein.

The removal of SOx is generally required before the NOx scrubber system, since the presence of SOx interferes with the NOx removal. Since the primary form of NOx in combustion processes is nitric oxide (NO), which is not water soluble, it is not possible to remove this form of NOx directly with a hydrogen peroxide scrubber. The addition of an NO oxidizing system is required to produce nitrogen dioxide ($NO_2$), which can be effectively scrubbed. The combination of the concentration of NO and its low solubility in water permit the separation of sulfuric and nitric acids by processes in accordance with the invention.

When the flue gas exits the scrubber 105, and it contacts the demister 108, the mist that contains sulfuric acid coalesces. The coalesced mist is returned to the scrubber 105 and the desulfurized flue gas flows to the NO oxidation tower 113. Several methods are available to oxidize NO to $NO_2$ with hydrogen peroxide. For example, the hydrogen peroxide can be decomposed on a heated catalytic surface as described in U.S. Pat. No. 6,793,903, issued on Sept. 21, 2004, which is commonly assigned and incorporated by reference in its entirety herein. UV light can be used in combination with a catalytic surface as described in U.S. Pat. No. 7,156,957 issued on Jan. 2, 2007, which is commonly assigned and incorporated by reference in its entirety herein. Additionally, UV light can be used in a catalytic configuration similar to monopropellant thrusters as described in U.S. patent application Ser. No. 10/641,581 filed Aug. 8, 2003, which is commonly assigned and incorporated by reference in its entirety herein.

In a process as described in U.S. Pat. No. 6,793,903, a hydrogen peroxide solution is directed onto a heated catalytic surface in a nitric oxide stream so that the hydrogen peroxide is decomposed to form oxidative free radicals, hydroxyl and hydroperoxyl, for the oxidation of the nitric oxide. The hydrogen peroxide solution is preferably delivered to the heated surface through a nozzle, which may also be heated, to increase the concentration of and thereby enrich the hydrogen peroxide solution. Additionally, or alternatively, higher concentrations of hydrogen peroxide can be generated as described below with reference to the hydrogen peroxide concentrator 114. Impinging an enriched hydrogen peroxide solution onto a heated surface accelerates the decomposition of hydrogen peroxide. Because the rapid decomposition of hydrogen peroxide occurs on the heated surface, there is no increased risk of explosion of stored hydrogen peroxide solution. Since the high temperature decomposition of hydrogen peroxide to oxidative free radicals, hydroxyl (.OH) and hydroperoxyl (HO2.), occurs in a stream of nitric oxide, distribution of the oxidative free radicals in the stream will cause rapid gas-phase oxidation of the nitric oxide to nitrogen dioxide.

In a process as described in U.S. Pat. No. 7,156,957, UV (ultraviolet) light is used to decompose hydrogen peroxide to form hydroperoxy and hydroxyl free radicals for the oxidation of gas stream components, such as nitric oxide produced in a combustion process. The UV radiation is configured to focus on a hydrogen peroxide vaporizing surface. To further increase the decomposition rate of the hydrogen peroxide, a preheating operation can be utilized prior to vaporization. Preheating above a boiling point of the hydrogen peroxide solution can be used to enrich the peroxide concentration. This increases the concentration of hydrogen peroxide at the vaporization point. Additionally, or alternatively, higher concentrations of hydrogen peroxide can be generated as described below with reference to the hydrogen peroxide concentrator 114. The vaporizer can include a catalytic surface to further accelerate the decomposition of the hydrogen peroxide.

In a process as described in U.S. patent application Ser. No. 10/641,581, nitric oxide in a gaseous stream is converted to nitrogen dioxide using oxidizing species generated through the use of concentrated hydrogen peroxide fed as a monopropellant into a catalyzed thruster assembly. The hydrogen peroxide is preferably stored at stable concentration levels, i.e., approximately 50%-70% by volume, and may be increased in concentration by pre-heating the hydrogen peroxide solution preceding decomposition in the thruster assembly. Although initial concentrations of 70% or less by volume are suitable for this process, higher concentrations of hydrogen peroxide are preferred and can be generated as described below with reference to the hydrogen peroxide concentrator 114. The exhaust of the thruster assembly, rich in hydroxyl and/or hydroperoxy radicals, may be fed into a stream containing oxidizable components, such as nitric oxide, to facilitate their oxidation.

Regardless of the desired method of oxidizing the NO species, the hydrogen peroxide may be supplied directly to the oxidation tower 113 or it may be further concentrated using hydrogen peroxide concentrator 114. Hydrogen peroxide concentrator 114 is adapted to concentrate the bulk hydrogen peroxide from hydrogen peroxide storage 112 to levels of at least 70% and preferably at least 80%. A suitable hydrogen peroxide concentrator is described in U.S. Pat. No. 7,122,166 issued on Oct. 17, 2006, which is commonly assigned and incorporated by reference in its entirety herein. Such systems are capable of producing aqueous hydrogen peroxide solutions of up to 85% or more by volume in a continuous process that facilitates the use of propellant-grade hydrogen peroxide solutions in the oxidation tower 113 without the need to store substantial quantities of this unstable material.

Figure 2:
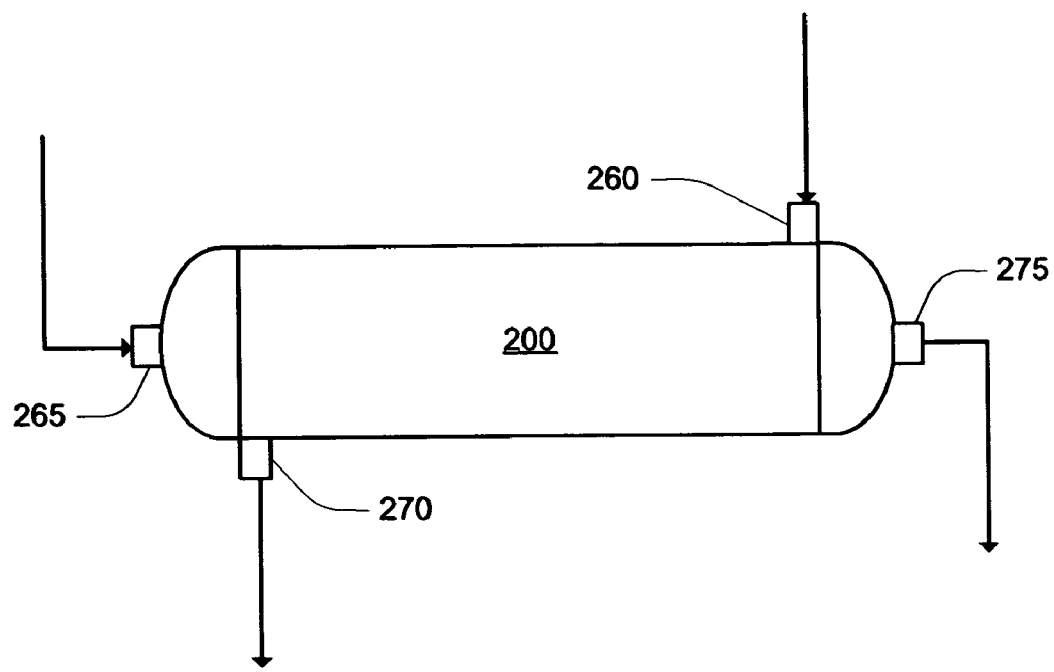
FIG. 2 is a schematic of a hydrogen peroxide concentrator in accordance with an embodiment of the invention.

FIG. 2 is a schematic of one hydrogen peroxide concentrator as described in U.S. Pat. No. 7,122,166 in accordance with one embodiment of the invention. A hydrogen peroxide feed solution is fed to a first inlet 260 of the concentrator 200 while a sweep gas is fed to a second inlet 265 of the concentrator 200. The concentrator 200 includes a membrane (not shown in FIG. 2) separating the hydrogen peroxide feed solution from the sweep gas. The hydrogen peroxide feed solution and the sweep gas are preferably run countercurrent through the concentrator 200, but could also be run in a concurrent fashion.

As the hydrogen peroxide solution and the sweep gas flow through the concentrator 200, water permeates the membrane from the hydrogen peroxide solution and is taken up by the sweep gas, thereby producing a concentrated hydrogen peroxide solution and a wet exit gas. The concentrated hydrogen peroxide solution exits the concentrator 200 through a first outlet 270 while the wet exit gas exits the concentrator 200 through a second outlet 275.

Figure 3:
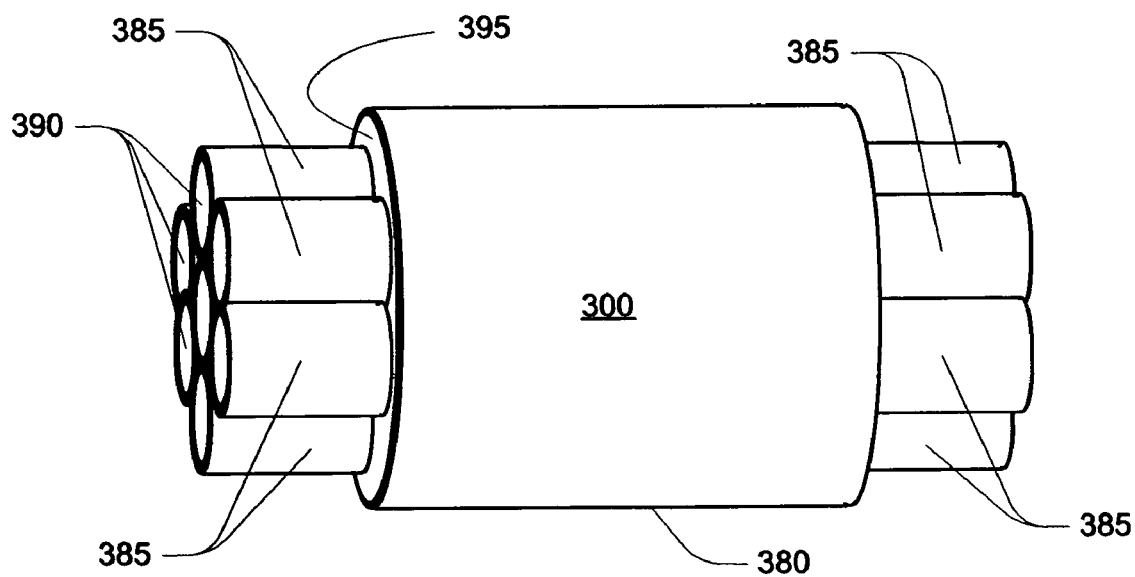
FIG. 3 is a cut-away view of a concentrator in accordance with an embodiment of the invention.

FIG. 3 is a cut-away view of another hydrogen peroxide concentrator as described in U.S. Pat. No. 7,122,166 in accordance with one embodiment of the invention. The concentrator 300 includes an outer shell 380 containing the membrane 385, shown in FIG. 3 using a hollow-fiber construction. The hydrogen peroxide solution 395 is separated from the sweep gas 390 by the membrane 385. For the embodiment depicted in FIG. 3, the sweep gas 390 or permeate runs on the inside of membrane 385 while the hydrogen peroxide solution 395 or feed runs between the outer shell 380 and the membrane 385. Other configurations, such as spiral-wound flat sheet or parallel-plate constructions may also be used provided that separate flow channels are provided for the sweep gas and the hydrogen peroxide solution. Such separator configurations are well known and will not be detailed herein.

The operation of the hydrogen peroxide concentrator in accordance with the invention is based on the permeability of water as compared with hydrogen peroxide through polymeric membranes. Although not essential, there are three important factors to consider when selecting a membrane for this application:

1. The membrane and all of the wetted components should be non-reactive with high concentrations of hydrogen peroxide. For example, if an 85% solution is desired, the wetted components must be non-reactive with an 85% solution of hydrogen peroxide.
2. The flux of water through the membrane should generally be high in order to reduce the total membrane area required for efficient removal of water.
3. The selectivity, which is the ratio of the permeability of water over the permeability of hydrogen peroxide, is preferably greater than two.

Examples of suitable membranes include polysulfone as well as perfluorinated polymers having sulfonic or carboxylic ionic functional groups. A specific example includes NAFION® brand of perfluorosulfonic acid/TFE copolymer available from E.I. DuPont de Nemours, Wilmington, Del., USA. NAFION® polymer has excellent chemical stability while at the same time allowing ion transport. NAFION® polymer includes sodium or potassium salts of either tetrafluoroethylene/perfluoro(4-methyl-3,6-dioxa-7-octene-1-sulfonic acid)copolymer or tetrafluoroethylene/perfluoro(4-methyl-3,6-dioxa-7-octene-1-sulfonyl fluoride)copolymer. NAFION® polymer has been commonly used for gas drying and humidifying operations as well as ion exchange systems such as fuel cells.

Various embodiments utilize air to transport the water vapor from the hydrogen peroxide solution, but other carrier gases may also be used, such as nitrogen or any other non-reactive gas. Since the capacity of the dry air to retain water is a function of temperature, several temperatures were examined. The results of this testing are summarized in Table 1. As can be seen, as the temperature increases for both membranes, the final concentration of hydrogen peroxide increases. These increases in concentration are primarily the result of the increased capacity of the sweep air when heated. It would be expected that an increase in temperature would extract more water from the hydrogen peroxide solution up to the boiling point of water, e.g., 100° C. at atmospheric pressure.

TABLE 1

The Concentration of Hydrogen Peroxide at Various Air Temperatures of the Permeate Sweep Gas at Atmospheric Pressure

| Membrane Material | Temperature | Initial Concentration | Final Concentration |
|---|---|---|---|
| NAFION ® | 19° C. | 67.6% | 75.7% |
|  | 42° C. | 69.6% | 81.4% |
|  | 50° C. | 69.6% | 85.4% |
| Polysulfone | 20° C. | 69.5% | 72.7% |
|  | 23° C. | 69.5% | 75.8% |

Another factor that increases the rate of water removal, and the concentration of the hydrogen peroxide, is the flow rate of the sweep gas. At any given temperature, doubling the flow rate of the sweep air will approximately double the rate of concentration increase.

The calculated selectivity of the NAFION® polymer membrane for water over hydrogen peroxide is 2.4 when the sweep gas temperature is 50° C. The selectivity of the polysulfone membrane was not calculated. However, the water flux through the polysulfone membrane is lower than the NAFION® polymer membrane, which means that the polysulfone membrane will require a larger surface area.

Due to the explosive potential of highly-concentrated hydrogen peroxide solutions, it is recommended that the temperature of the system be maintained below the boiling point of a 72% hydrogen peroxide solution.

While the various trials were performed at ambient pressures on the permeate side, lower pressures would accelerate the process by increasing the pressure differential across the membrane. By utilizing a suitable membrane support structure, it is expected that pressure differentials of 100 psi or more could be maintained through increasing pressure on the feed side and/or decreasing pressure on the permeate side. Additionally, it is expected that the introduction of turbulence, e.g., through the use of baffles on one or both sides of the membrane, would improve the transport rates.

The required membrane area is dependent on the desired production rate and the permeability of the membrane. For the NAFION® polymer membrane, an area of about 600 sq ft is expected to be required to concentrate 1 gal per hour of hydrogen peroxide to 85 percent.

The flue gas that primarily contains $NO_2$ exits the oxidation tower 113 and passes into the NOx and/or heavy metal scrubber 115. Example scrubber systems for scrubber 115 are described in U.S. Pat. No. 6,039,783, issued to Lueck et al. on Mar. 21, 2000 and titled "PROCESS AND EQUIPMENT FOR NITROGEN OXIDE WASTE CONVERSION TO FERTILIZER" and U.S. Pat. No. 6,641,638, issued to Lueck et al. on Nov. 4, 2003 and titled "PROCESS FOR NITROGEN OXIDE WASTE CONVERSION TO FERTILIZER," each of which is commonly assigned and incorporated by reference in their entirety herein. Scrubber systems such as those described in U.S. Pat. Nos. 6,039,783 and 6,641,638 are advantageous for use with embodiments of the invention as they utilize control of the hydrogen peroxide concentration to improve scrubber efficiency.

As generally described in U.S. Pat. Nos. 6,039,783 and 6,641,638, gas streams are treated in a method including directing a gas stream containing at least one nitrogen-containing oxidizing agent to a first contact zone and contacting the gas stream with water to form oxy acid(s) of nitrogen. The method further includes directing the acid(s) as a second stream to a second contact zone and exposing the second stream to hydrogen peroxide which is present within the second contact zone to convert at least some of any oxy acid(s) of nitrogen to a nitrate ion. The method still further includes sampling the second contact zone to determine the relative amount of hydrogen peroxide within the second contact zone and adding hydrogen peroxide to the second contact zone when the sampling determines there is less than a predetermined level of hydrogen peroxide in the second stream. For one embodiment, the predetermined level is an amount necessary to provide a stoichiometric excess of hydrogen peroxide for reaction with the gas stream. For a further embodiment, the predetermined level is an absolute level of hydrogen peroxide in the second stream, e.g., approximately 0.1% hydrogen peroxide by volume in the second stream. The level of hydrogen peroxide in the scrubber liquor of scrubber 115 is controlled by controlling the flow rate of hydrogen peroxide into the scrubber 115.

The scrubber liquor from scrubber 115 is recirculated with centrifuge 116 until the nitric acid reaches the desired concentration. When the desired concentration of nitric acid is reached, it is discharged to nitric acid storage 117. Any residual solids that may contain heavy metals, such as Hg, are discharged into recycle solids container 111. The processed flue gas exits the scrubber 115 to the neutralizer 118 where residual acid gases are neutralized with a base. The neutralized gas then flows to the heat exchanger 101 to be reheated if necessary to facilitate flow out an exhaust stack as processed flue gas 152.

This emission control system provides a method based on hydrogen peroxide to reduce the NOx, SOx, and mercury emissions from combustion sources to acceptable levels as established by the US Environmental Production Agency. In addition, useful by-product streams of nitric acid, sulfuric acid, and feed stock for mercury production may be isolated.

CONCLUSION

Methods and apparatus for controlling emissions have been described. The methods utilize hydrogen peroxide to reduce NOx, SOx and mercury (or other heavy metal) emissions. Continuous concentration of hydrogen peroxide to levels approaching or exceeding propellant-grade hydrogen peroxide facilitates increased system efficiency. By utilizing methods and apparatus in accordance with the invention, combustion flue gas streams can be treated for the removal of NOx, SOx and heavy metals, while isolating useful by-products streams of sulfuric acid and nitric acid as well as solids for the recovery of the heavy metals.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof

What is claimed is:

1. A method of treating a gas stream for removal of at least oxides of sulfur and oxides of nitrogen, the method comprising:
    scrubbing the gas stream with a first hydrogen peroxide solution and removing a by-product stream containing sulfuric acid;
    after scrubbing the gas stream with the first hydrogen peroxide solution, oxidizing the gas stream using a second hydrogen peroxide solution in an oxidation process adapted to convert nitric oxide to nitrogen dioxide; and
    after oxidizing the gas stream, scrubbing the gas stream with a third hydrogen peroxide solution and removing a by-product stream containing nitric acid;
    wherein the second hydrogen peroxide solution is concentrated to a level of approximately 75% or more by volume prior to use in oxidizing the gas stream.

2. The method of claim 1, wherein scrubbing the gas stream with the first hydrogen peroxide solution further comprises:
    feeding the gas stream into a scrubber;
    feeding the first hydrogen peroxide solution into the scrubber;
    removing solids from a resulting scrubber liquor; and
    recycling the scrubber liquor into the scrubber with the first hydrogen peroxide solution.

3. The method of claim 2, further comprising:
    sampling a mixture of the first hydrogen peroxide solution and the recycled scrubber liquor for a level of hydrogen peroxide; and
    controlling the level of hydrogen peroxide in the mixture to be at least a predetermined level.

4. The method of claim 2, wherein removing solids comprises centrifuging the resulting scrubber liquor.

5. The method of claim 1, wherein scrubbing the gas stream with the third hydrogen peroxide solution further comprises:
    feeding the gas stream into a scrubber;
    feeding the third hydrogen peroxide solution into the scrubber;
    removing solids from a resulting scrubber liquor; and
    recycling the scrubber liquor into the scrubber with the third hydrogen peroxide solution.

6. The method of claim 5, further comprising:
    sampling a mixture of the third hydrogen peroxide solution and the recycled scrubber liquor for a level of hydrogen peroxide; and
    controlling the level of hydrogen peroxide in the mixture to be at least a predetermined level.

7. The method of claim 6, wherein the predetermined level of hydrogen peroxide is an amount necessary to provide a stoichiometric excess of hydrogen peroxide for reaction with the gas stream.

8. The method of claim 1, wherein the second hydrogen peroxide solution is an aqueous hydrogen peroxide solution concentrated using a process comprising:
    passing the second hydrogen peroxide solution on a first side of a membrane; and
    passing a sweep gas on a second side of the membrane;
    wherein the membrane is selective to the permeability of water over the permeability of hydrogen peroxide.

9. The method of claim 8, wherein a ratio of the permeability of water over the permeability of hydrogen peroxide through the membrane is greater than two.

10. The method of claim 8, wherein the membrane comprises a material selected from the group consisting of polysulfone and a perfluorinated polymer having sulfonic or carboxylic ionic functional groups.

11. The method of claim 8, wherein the membrane comprises a material selected from the group consisting of a sodium salt of tetrafluoroethylene/perfluoro(4-methyl-3,6-dioxa-7-octene-1-sulfonic acid)copolymer, a potassium salt of tetrafluoroethylene/perfluoro(4-methyl-3,6-dioxa-7-octene-1-sulfonic acid)copolymer, a sodium salt of tetrafluoroethylene/perfluoro(4-methyl-3,6-dioxa-7-octene-1-sulfonyl fluoride)copolymer and a potassium salt of tetrafluoroethylene/perfluoro(4-methyl-3,6-dioxa-7-octene-1-sulfonyl fluoride)copolymer.

12. The method of claim 8, wherein the sweep gas is maintained at a temperature of 100° C. or less.

13. The method of claim 8, wherein the sweep gas is air maintained at a temperature of approximately 20° C. to 75° C.

14. The method of claim 1, wherein the second hydrogen peroxide solution is an aqueous hydrogen peroxide solution concentrated using a process comprising:
    feeding the second hydrogen peroxide solution to a first inlet of a concentrator having a membrane to separate the second hydrogen peroxide solution from a sweep gas, the second hydrogen peroxide solution having an initial concentration of less than 70% by volume;
    feeding the sweep gas to a second inlet of the concentrator, wherein a pressure of the sweep gas is less than a pressure of the second hydrogen peroxide solution and a pressure differential across the membrane is approximately 100 psi or less;
    transporting water from the second hydrogen peroxide solution through the membrane to be taken up by the sweep gas, thereby generating a wet sweep gas;

removing a concentrated second hydrogen peroxide solution from a first outlet of the concentrator; and
removing the wet sweep gas from a second outlet of the concentrator.

15. The method of claim 14, wherein the membrane comprises a material selected from the group consisting of polysulfone and a perfluorinated polymer having sulfonic or carboxylic ionic functional groups.

16. The method of claim 14, wherein the membrane comprises a material selected from the group consisting of a sodium salt of tetrafluoroethylene/perfluoro(4-methyl-3,6-dioxa-7-octene-1-sulfonic acid)copolymer, a potassium salt of tetrafluoroethylene/perfluoro(4-methyl-3,6-dioxa-7-octene-1-sulfonic acid)copolymer, a sodium salt of tetrafluoroethylene/perfluoro(4-methyl-3,6-dioxa-7-octene-1-sulfonyl fluoride)copolymer and a potassium salt of tetrafluoroethylene/perfluoro(4-methyl-3,6-dioxa-7-octene-1-sulfonyl fluoride)copolymer.

17. The method of claim 14, wherein a sufficient amount of water is transported through the membrane to increase the concentration of the second hydrogen peroxide solution to at least 75% by volume at temperatures of less than 30° C.

18. The method of claim 14, wherein a sufficient amount of water is transported through the membrane to increase the concentration of the second hydrogen peroxide solution to at least 85% by volume at temperatures of less than 75° C.

19. The method of claim 1, wherein oxidizing the gas stream using the second hydrogen peroxide solution further comprises:
impinging the second hydrogen peroxide solution onto a heated catalytic surface in the presence of the gas stream.

20. The method of claim 19, further comprising:
directing ultraviolet light at the heated catalytic surface while impinging the second hydrogen peroxide solution onto the heated catalytic surface.

21. The method of claim 1, wherein oxidizing the gas stream using the second hydrogen peroxide solution further comprises:
subjecting the second hydrogen peroxide solution to ultraviolet light in the presence of the gas stream.

22. The method of claim 1, wherein oxidizing the gas stream using the second hydrogen peroxide solution further comprises:
feeding the second hydrogen peroxide solution as a monopropellant into a catalyzed thruster assembly; and
subjecting the gas stream to an exhaust of the catalyzed thruster assembly.

23. The method of claim 22, further comprising:
subjecting the exhaust of the catalyzed thruster assembly to ultraviolet light in the presence of the gas stream.

24. A method of treating a combustion flue gas stream for removal of at least oxides of sulfur and oxides of nitrogen, the method comprising:
cooling the combustion flue gas stream, thereby generating a cooled gas stream;
washing the cooled gas stream with a water wash, thereby generating a washed gas stream;
scrubbing the washed gas stream, thereby generating a first scrubbed gas stream and a first scrubber liquor;
removing solids from the first scrubber liquor, thereby generating a first recycled scrubber liquor;
combining a portion of the first recycled scrubber liquor with a first hydrogen peroxide solution as a first scrubbing mixture for use in scrubbing the washed gas stream and controlling a flow rate of the first hydrogen peroxide solution to maintain a predetermined level of hydrogen peroxide in the first scrubbing mixture;
removing a remaining portion of the first recycled scrubber liquor, thereby isolating a by-product stream containing sulfuric acid;
demisting the first scrubbed gas stream, thereby generating a demisted gas stream;
oxidizing the demisted gas stream using a second hydrogen peroxide solution, thereby generating an oxidized gas stream, wherein the second hydrogen peroxide solution is generated using a process comprising:
feeding an aqueous hydrogen peroxide solution to a first inlet of a concentrator having a membrane to separate the aqueous hydrogen peroxide solution from a sweep gas, the aqueous hydrogen peroxide solution having an initial concentration of less than 70% by volume;
feeding the sweep gas to a second inlet of the concentrator, wherein a pressure of the sweep gas is less than a pressure of the aqueous hydrogen peroxide solution and a pressure differential across the membrane is approximately 100 psi or less;
transporting water from the aqueous hydrogen peroxide solution through the membrane to be taken up by the sweep gas, thereby generating a wet sweep gas;
removing a concentrated hydrogen peroxide solution from a first outlet of the concentrator as the second hydrogen peroxide solution; and
removing the wet sweep gas from a second outlet of the concentrator;
scrubbing the oxidized gas stream, thereby generating a second scrubbed gas stream and a second scrubber liquor;
removing solids from a portion of the second scrubber liquor, thereby generating a second recycled scrubber liquor;
combining the second recycled scrubber liquor with a third hydrogen peroxide solution as a second scrubbing mixture for use in scrubbing the oxidized gas stream and controlling a flow rate of the third hydrogen peroxide solution to maintain a predetermined level of hydrogen peroxide in the second scrubbing mixture;
removing a remaining portion of the second scrubber liquor, thereby isolating a by-product stream containing nitric acid; and
neutralizing the second scrubbed gas by contacting it with a base, thereby generating a neutralized gas stream.

25. The method of claim 24, further comprising:
heating the neutralized gas stream for exhaust through a flue stack.

26. The method of claim 24, wherein the membrane comprises a material selected from the group consisting of polysulfone and a perfluorinated polymer having sulfonic or carboxylic ionic functional groups.

27. The method of claim 24, wherein the membrane comprises a material selected from the group consisting of a sodium salt of tetrafluoroethylene/perfluoro(4-methyl-3,6-dioxa-7-octene-1-sulfonic acid)copolymer, a potassium salt of tetrafluoroethylene/perfluoro(4-methyl-3,6-dioxa-7-octene-1-sulfonic acid)copolymer, a sodium salt of tetrafluoroethylene/perfluoro(4-methyl-3,6-dioxa-7-octene-1-sulfonyl fluoride)copolymer and a potassium salt of tetrafluoroethylene/perfluoro(4-methyl-3,6-dioxa-7-octene-1-sulfonyl fluoride)copolymer.

28. The method of claim 24, wherein a sufficient amount of water is transported through the membrane to increase the concentration of the second hydrogen peroxide solution to at least 75% by volume at temperatures of less than 30° C.

29. The method of claim 24, wherein a sufficient amount of water is transported through the membrane to increase the concentration of the second hydrogen peroxide solution to at least 85% by volume at temperatures of less than 75° C.

30. The method of claim 24, wherein oxidizing the demisted gas stream using the second hydrogen peroxide solution further comprises:
impinging the second hydrogen peroxide solution onto a heated catalytic surface in the presence of the demisted gas stream.

31. The method of claim 30, further comprising:
directing ultraviolet light at the heated catalytic surface while impinging the second hydrogen peroxide solution onto the heated catalytic surface.

32. The method of claim 24, wherein oxidizing the demisted gas stream using the second hydrogen peroxide solution further comprises:
subjecting the second hydrogen peroxide solution to ultraviolet light in the presence of the demisted gas stream.

33. The method of claim 24, wherein oxidizing the demisted gas stream using the second hydrogen peroxide solution further comprises:
feeding the second hydrogen peroxide solution as a monopropellant into a catalyzed thruster assembly; and
subjecting the demisted gas stream to an exhaust of the catalyzed thruster assembly.

34. The method of claim 33, further comprising:
subjecting the exhaust of the catalyzed thruster assembly to ultraviolet light in the presence of the demisted gas stream.

35. A system for the removal of at least oxides of sulfur and oxides of nitrogen from a combustion flue gas, the system comprising:
a heat exchanger coupled to receive the flue gas;
a water wash coupled to receive an exit gas stream from the heat exchanger;
a first scrubber coupled to receive an exit gas stream from the water wash and coupled to receive a first hydrogen peroxide solution and a recycled liquor from the first scrubber;
a demister coupled to receive an exit gas stream from the first scrubber;
an oxidation tower coupled to receive an exit gas stream from the demister and a second hydrogen peroxide solution from a hydrogen peroxide concentrator;
a second scrubber coupled to receive an exit gas stream from the oxidation tower and coupled to receive a third hydrogen peroxide solution and a recycled liquor from the second scrubber; and
a neutralizer coupled to receive an exit gas stream from the second scrubber;
wherein the hydrogen peroxide concentrator comprises a membrane for separating the second hydrogen peroxide solution from a sweep gas; and
wherein the membrane is selective to the permeability of water over the permeability of hydrogen peroxide, thereby allowing water to transport through the membrane from the second hydrogen peroxide solution to the sweep gas.

36. The system of claim 35, wherein the membrane comprises a material selected from the group consisting of polysulfone and a perfluorinated polymer having sulfonic or carboxylic ionic functional groups.

37. The system of claim 35, wherein the membrane comprises a material selected from the group consisting of a sodium salt of tetrafluoroethylene/perfluoro(4-methyl-3,6-dioxa-7-octene-1-sulfonic acid)copolymer, a potassium salt of tetrafluoroethylene/perfluoro(4-methyl-3,6-dioxa-7-octene-1-sulfonic acid)copolymer, a sodium salt of tetrafluoroethylene/perfluoro(4-methyl-3,6-dioxa-7-octene-1-sulfonyl fluoride)copolymer and a potassium salt of tetrafluoroethylene/perfluoro(4-methyl-3,6-dioxa-7-octene-1-sulfonyl fluoride)copolymer.

* * * * *